United States Patent [19]

Strout

[11] Patent Number: 4,648,063
[45] Date of Patent: Mar. 3, 1987

[54] PROGRAMMING A PERIPHERAL COMPUTER

[75] Inventor: Kenneth M. Strout, Bartlesville, Okla.

[73] Assignee: Phillips Petroleum Company, Bartlesville, Okla.

[21] Appl. No.: 955,901

[22] Filed: Oct. 30, 1978

[51] Int. Cl.[4] .................. G06F 13/00; G01V 1/28
[52] U.S. Cl. .................. 364/900; 364/421; 367/60
[58] Field of Search .......... 364/200, 900, 420–422; 235/304, 304.1, 304.2; 340/15.5 DP, 15.5 TS, 146.1 C; 371/19; 367/59, 60, 76

[56] References Cited

U.S. PATENT DOCUMENTS

| | | | |
|---|---|---|---|
| 3,631,405 | 12/1971 | Hoff | 364/200 |
| 3,753,236 | 8/1973 | Flynn | 364/200 |
| 3,760,365 | 9/1973 | Kurtzberg et al. | 364/200 |
| 3,930,145 | 12/1975 | Fort et al. | 364/421 |
| 3,932,843 | 1/1976 | Trelut et al. | 364/200 |
| 3,938,098 | 2/1976 | Garlic | 364/200 |
| 3,969,723 | 7/1976 | Kennicott | 364/200 |
| 4,042,914 | 8/1977 | Curley et al. | 364/200 |
| 4,115,866 | 9/1978 | Janssens et al. | 364/900 |
| 4,131,941 | 12/1978 | Siegel et al. | 364/200 |

OTHER PUBLICATIONS

"Microprocessors & Small Digital Computer Systems for Engineers & Scientists" by Korn, Published in 1977 by McGraw Hill pp. 235-243.

"Loading Microcode from a Processor to a Microcontroller" by Brown & Dixon, Published in IBM Technical Disclosure Bulletin, vol. 19, No. 9 Feb. 1977, pp. 3278-3280.

Electronics—"Slave Microcomputer Lightens Main Microprocessor Load" by Phillips and Goodman vol. 50, No. 14, Jul. 7, 1977.

*Primary Examiner*—Gary Chin
*Attorney, Agent, or Firm*—French and Doescher

[57] ABSTRACT

In a system wherein a peripheral computer is utilized to lighten the load on a central computer or to perform a special function which cannot be performed by the central computer, method and apparatus is provided whereby the central computer can be utilized to program the peripheral computer. A volatile memory is programmed by the central computer and then the volatile memory is switched to the peripheral computer to allow the peripheral computer to run the program set up in the volatile memory to determine if the program is operational. Once the program has been determined to be operational, the program is transferred to a nonvolatile memory which is associated with the peripheral computer system and the program is then available for use in the peripheral computer system.

4 Claims, 6 Drawing Figures

PROGRAMMING A PERIPHERAL COMPUTER

This invention relates to method and apparatus for programming a peripheral computer. In a particular aspect this invention relates to method and apparatus for using a central computer to program a peripheral computer. In another particular aspect this invention relates to method and apparatus for using a central computer to program a volatile memory and then switching the volatile memory to a peripheral computer to determine if the program is operational for the peripheral computer. In another particular aspect this invention relates to method and apparatus for correcting a program before the program is loaded into a nonvolatile memory associated with a peripheral computer.

It has been common in the past to use a central computer to control a plurality of peripheral devices or to perform a number of desired operations. However, as the applications for computer technology has increased, the complexity of the operations being controlled by computers and the complexities of the problems being solved by computer systems have also continued to increase. In some cases the complexity of the systems in which a central computer is employed have increased to a point where the capabilities of the central computer are being taxed.

As a matter of economics and simplicity in using the computer system, it is desirable to utilize a well-known and established system for the central computer. However, in some cases special applications are present which cannot be performed by a standard computer system but rather require a specialized computer system. The specialized computer system may be needed to perform only a small function in the total operation which is under computer control.

A peripheral computer, which is otherwise referred to as a slave computer, may be used to both lighten the load on a central computer and to perform specialized functions which cannot be performed by a standard computer system. As used herein, the term peripheral computer refers to a computer which is under the control of another computer which is referred to herein as a central computer. The use of a peripheral computer with a central computer can greatly enhance the operations which can be placed under computer control and can perform specialized functions which could not ordinarily be performed by a standard computer system.

Many times the programs for a specialized or small computer system which would be employed as a peripheral computer system are not well developed and documented. It is extremely advantageous to be able to use the central computer to develop programs for the peripheral computer to prevent having to develop a separate set of programs for the peripheral computer. It is thus an object of this invention to provide method and apparatus for utilizing a central computer to program a peripheral computer. It is a further object of this invention to provide method and apparatus for utilizing a central computer to program a volatile memory and then switching the volatile memory to a peripheral computer to determine if the program is operational for the peripheral computer.

Ordinarily in a computer system, nonvolatile memories, as opposed to volatile memories, are utilized to store programs to be used in the computer system. As used herein, the term "volatile memory" refers to a memory in which a program stored in the memory is destroyed if power to the memory is lost. The term "nonvolatile memory" refers to a memory in which a memory stored in the memory is not destroyed if power is lost to the memory. The program is commonly loaded into the nonvolatile memory by a technique which is referred to as masking or "burning in". Once a program is loaded into a nonvolatile memory it is very difficult to debug a program and change the program in the nonvolatile memory. If the program is bad, then an expensive nonvolatile memory is lost or time must be taken to pull the nonvolatile memory out of the computer system and reburn it. Because of this, it is extremely desirable to debug the program before it is loaded into the nonvolatile memory. Accordingly, it is another particular object of this invention to provide method and apparatus for correcting a program before the program is loaded into a nonvolatile memory associated with a peripheral computer.

In accordance with the present invention, method and apparatus is provided whereby the central computer is utilized to program a volatile memory. The volatile memory cannot be used for program storage in a computer system because if power is lost the program is destroyed in the volatile memory. However, it is very easy to change a program which is stored in a volatile memory and this feature makes a volatile memory desirable for use in the present invention.

Once a program has been loaded into a volatile memory, control of the volatile memory is switched to the peripheral computer to allow the peripheral computer to run the program stored in the volatile memory to determine if the program is operational for the peripheral computer. If the program is not operational, control of the volatile memory is switched back to the central computer and the program is corrected. Once the program has been established to be operational, the program set up in the volatile memory is then loaded into a nonvolatile memory associated with the peripheral computer. The program is then available to be utilized by the peripheral computer to perform the operations specified for the peripheral computer system. In this manner, method and apparatus is provided whereby the central computer can be utilized to set up a computer program for the peripheral computer and method and apparatus is also provided whereby the computer program set up by the central computer can be easily debugged before being loaded into the nonvolatile memory associated with the peripheral computer system.

Other objects and advantages of the invention will be apparent from the description of the invention and the appended claims as well as from the detailed description of the drawings in which:

FIG. 35 is an illustration of the location of a random access memory utilized to develop and test programs for the 2900 microprocessor illustrated in FIG. 2a;

Figure 1:
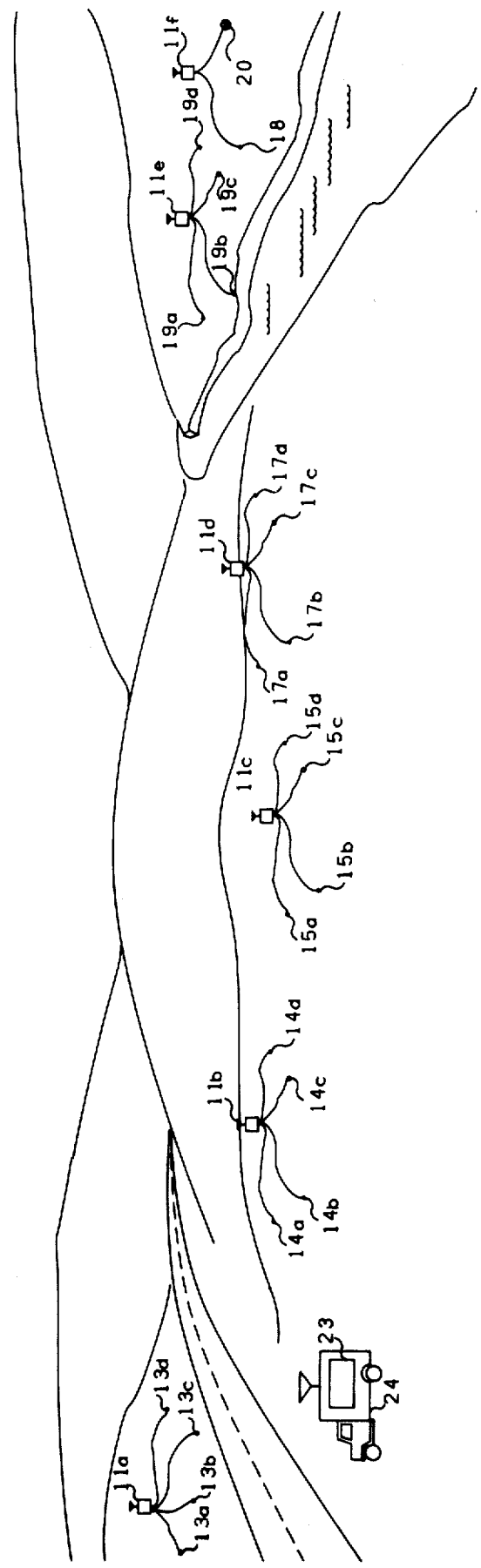
FIG. 1 is an illustration of a possible physical arrangement of the components of a seismic exploration system.
Figure 2A:
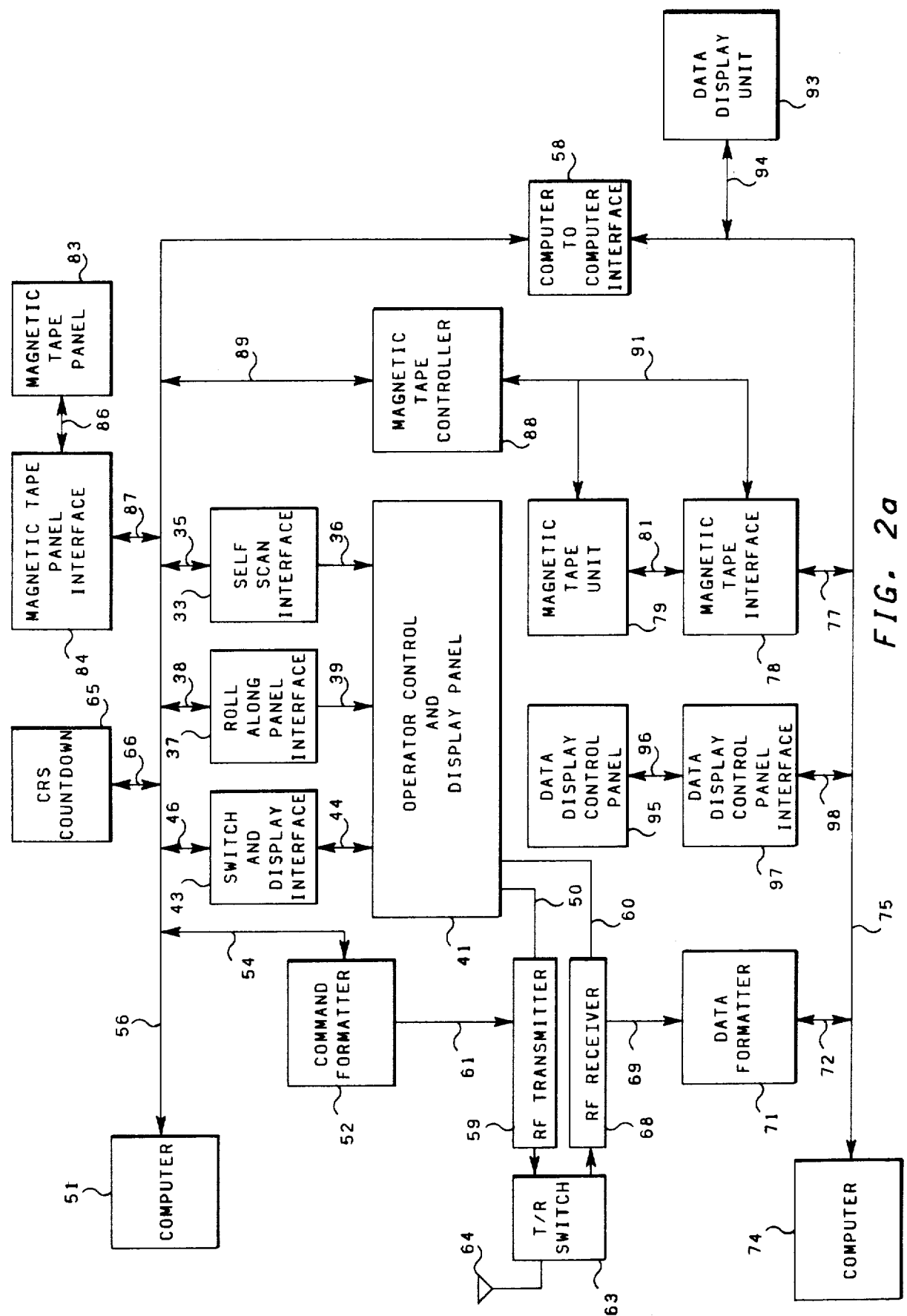
FIG. 2a is a block diagram of a central recording station.
Figure 2B:
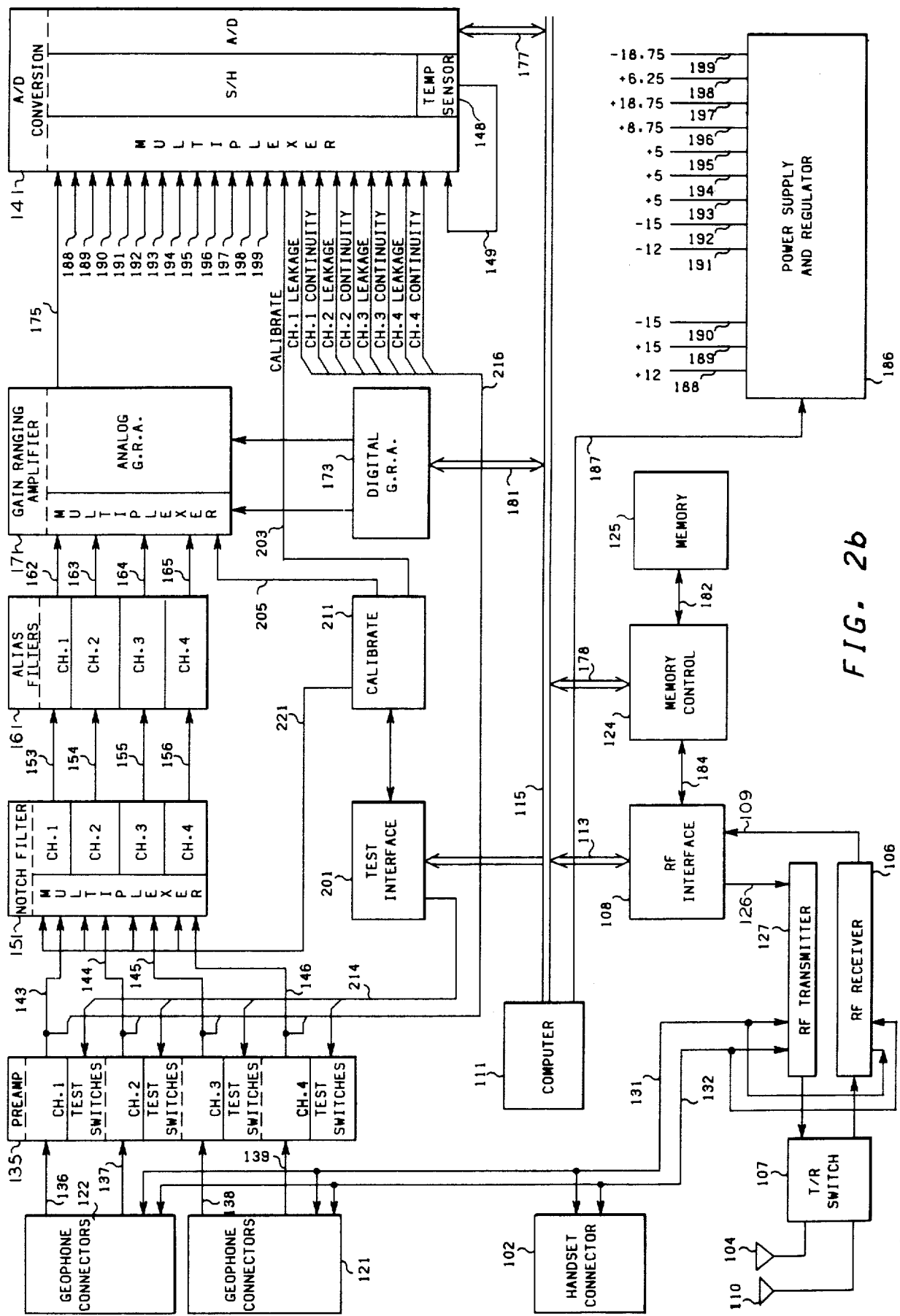
FIG. 2b is a block diagram of the remote telemetry unit.
Figure 35:
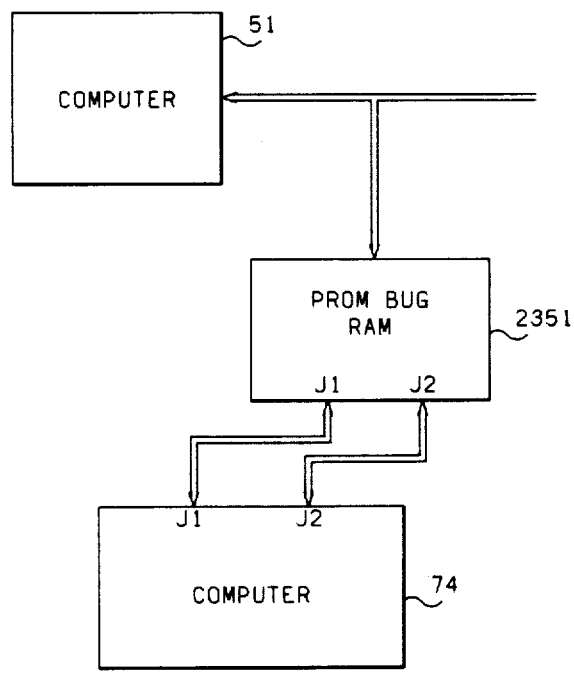
Figure 36:
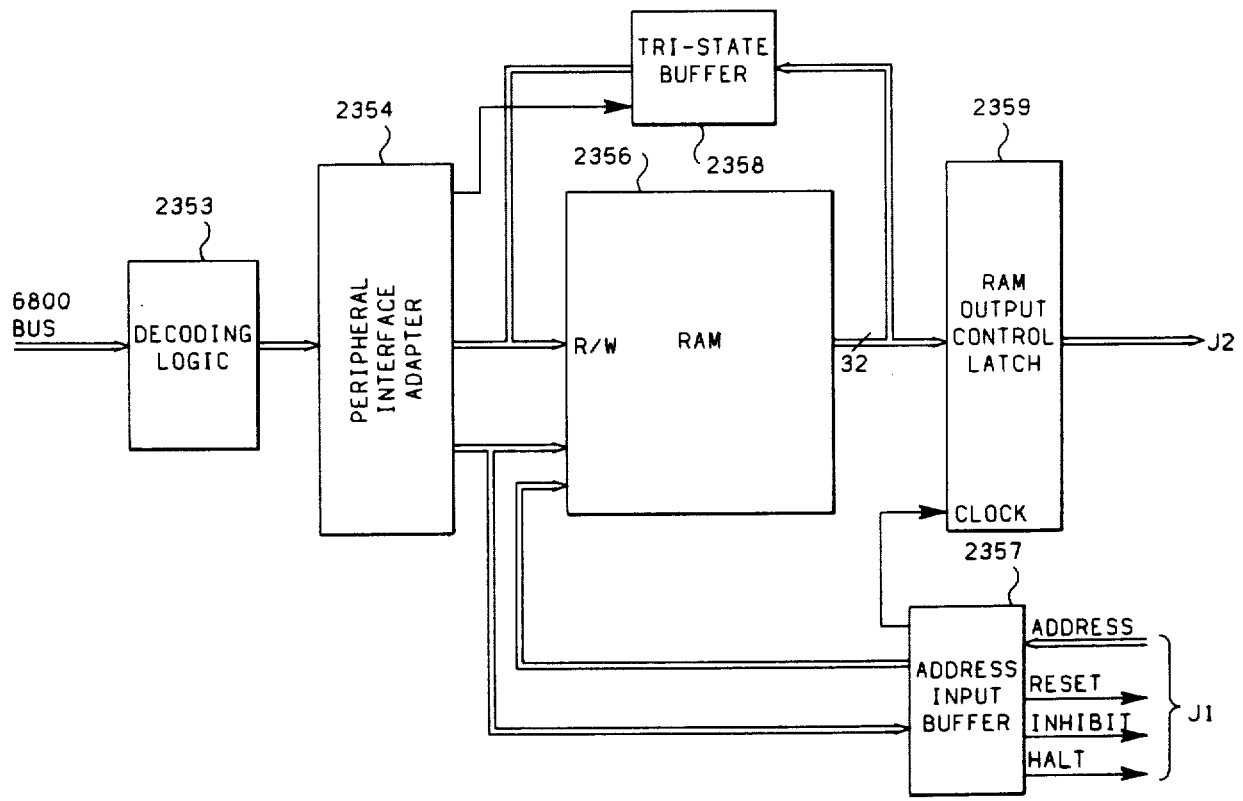
FIG. 36 is a schematic of the PROM bug RAM illustrated in FIG. 35.
Figure 37:
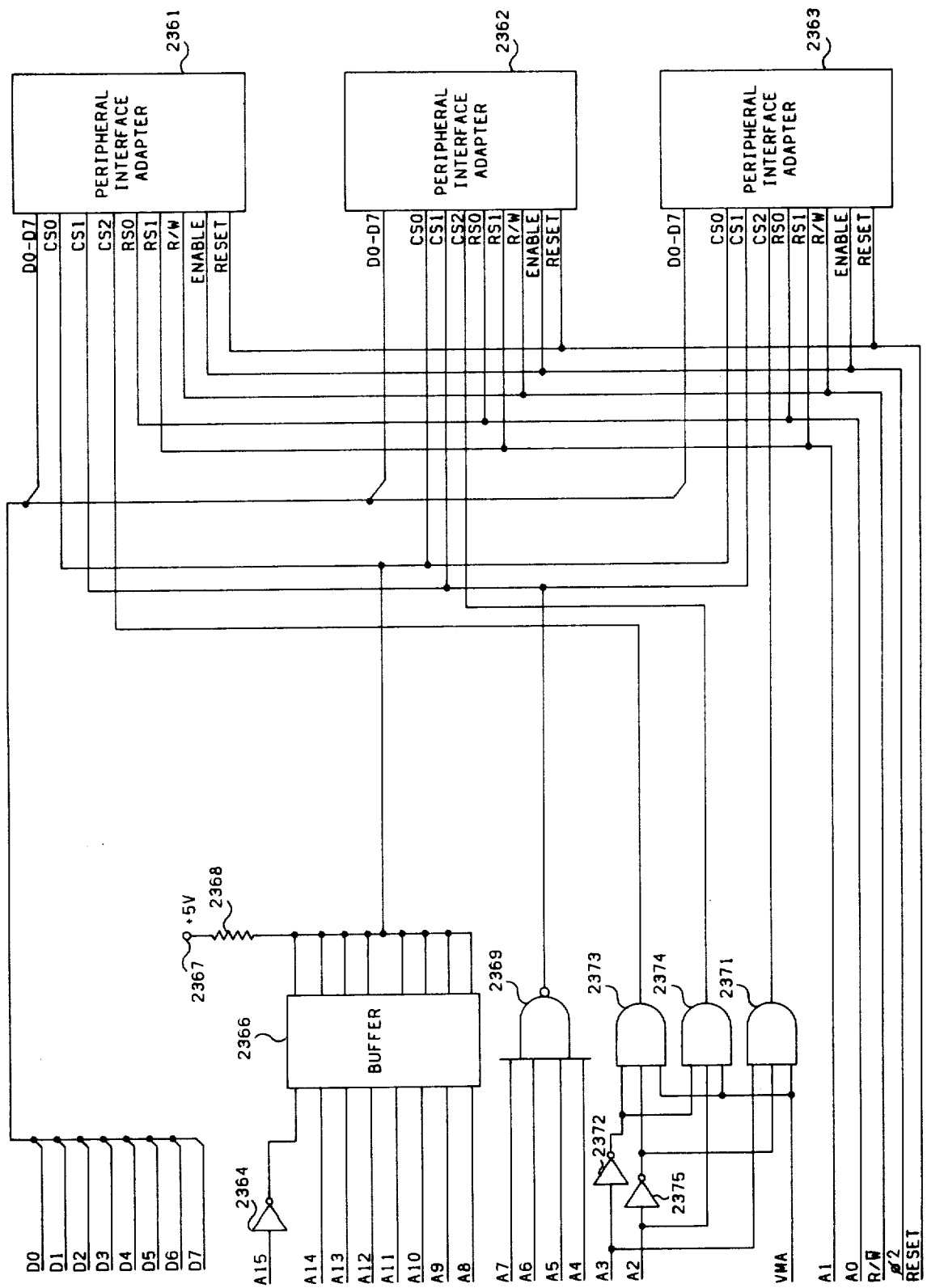
FIG. 37 is a schematic of the decoding logic illustrated in FIG. 36.

FIGS. 3—34 and 38-73 of U.S. Pat. No. 4,257,098 are hereby incorporated by reference. The brief description of FIGS. 3-34 and 38-73 in U.S. Pat. No. 4,257,098 is also hereby incorporated by reference.

The invention is described in terms of a seismic exploration system but it is noted that the invention is not limited to a seismic exploration system but is rather applicable to any system in which it is desired to utilize a peripheral computer to supplement a central computer.

In the preferred embodiment of the present invention, the central computer utilized in the 6800 microprocessor manufactured by Motorola Semiconductor. The peripheral computer utilized is the 2900 microprocessor system manufactured by Advanced Micro Devices. The invention, however, is not limited to these specific microprocessors systems but is rather applicable to other computer systems which could be utilized for central computer systems or peripheral computer systems.

In the preferred embodiment of the present invention, the nonvolatile memory utilized is a programmable read only memory (PROM). The volatile memory utilized is a random access memory (RAM). The invention is not limited to these specific memories but is rather applicable to other types of volatile and nonvolatile memories.

The 2900 microprocessor system is utilized to reduce the load on the 6800 microprocessor system. The 2900 microprocessor system is also utilized because of its fast cycle time which allows handling of the data rates which must be utilized in a commercially feasible seismic exploration system. The 6800 microprocessor system will not handle the data rates which must be used in modern seismic exploration. However, it is extremely desirable to use the 6800 microprocessor system for overall control of the seismic exploration system because the 6800 microprocessor system is a standard and well documented system.

The detailed description of the drawings and the appendix of U.S. Pat. No. 4,257,098 are hereby incorporated by reference.

That which is claimed is:

1. A seismic system for geophysical exploration comprising:
    a plurality of remote geophone monitoring means,
    each of said remote geophone monitoring means being adapted to receive electrical signals from at least one geophone means; and
    a central control means for generating electrical signals for initiating the operation of said plurality of remote geophone monitoring means;
    each of said plurality of remote geophone monitoring means comprising:
        means for sampling electrical signals, provided from at least one geophone means, and for converting the sampled electrical signals into digital seismic data; and
        means for transmitting said digital seismic data to said central control means;
    said central control means comprising:
        means for receiving data from said plurality of remote geophone monitoring means;
        means for storing said data;
        a central computer means for controlling said central control means;
        a peripheral computer means for processing data received by said central control means, said peripheral computer means containing a nonvolatile memory means for computer program storage;
        a computer volatile memory means;
        interface means for supplying addresses, commands and data from said central computer means to said volatile memory means to thereby control and load programs into said volatile memory means;
        means for disabling said interface means after a program has been loaded into said volatile memory means; and
        means for transferring control of said volatile memory from said central computer to said peripheral computer means to thereby enable said peripheral computer means to run the computer program stored in said volatile memory means to thereby determine if the computer program stored in said volatile memory means is operational for said peripheral computer means.

2. Apparatus in accordance with claim 1 additionally comprising means for enabling said interface means to thereby transfer control of said volatile memory means from said peripheral computer means to said central computer means, the addresses, commands and data from said central computer means being used to change the computer program stored in said volatile memory means if changes are required.

3. Apparatus in accordance with claim 2 additionally comprising means for loading the computer program stored in said volatile memory means into said nonvolatile memory means after the computer program stored in said volatile memory means has been determined to be operational for said peripheral computer means, to thereby program said peripheral computer means.

4. Apparatus in accordance with claim 3 wherein said volatile memory means is a random access memory and said non-volatile memory means is a programmable read only memory.

* * * * *